United States Patent
An et al.

(10) Patent No.: US 11,176,011 B2
(45) Date of Patent: Nov. 16, 2021

(54) APPARATUS AND METHOD FOR TRANSMITTING FUZZING DATA FOR ONE-WAY PROTOCOL SOFTWARE FUZZING

(71) Applicant: ELECTRONICS AND TELECOMMUNICATIONS RESEARCH INSTITUTE, Daejeon (KR)

(72) Inventors: Gae-Il An, Daejeon (KR); Won-Jun Song, Daejeon (KR); Yang-Seo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/077,690

(22) Filed: Oct. 22, 2020

(65) Prior Publication Data

US 2021/0165722 A1    Jun. 3, 2021

(30) Foreign Application Priority Data

Nov. 29, 2019  (KR) .......................... 10-2019-0157664

(51) Int. Cl.
  *G06F 11/00*   (2006.01)
  *G06F 11/263*  (2006.01)
  *G06F 11/22*   (2006.01)

(52) U.S. Cl.
  CPC ........ *G06F 11/263* (2013.01); *G06F 11/2273* (2013.01)

(58) Field of Classification Search
  CPC .... G06F 11/26; G06F 11/263; G06F 11/2635; G06F 11/372; G06F 11/2273; G06N 7/046; G06N 5/00; G06N 5/048; G06B 13/02855; G06B 2219/3406
  USPC ...................................................... 714/1–57
  See application file for complete search history.

(56) References Cited

U.S. PATENT DOCUMENTS

| | | | |
|---|---|---|---|
| 8,539,449 B2 | 9/2013 | Kim et al. | |
| 9,654,490 B2 | 5/2017 | Kim et al. | |
| 10,846,410 B2* | 11/2020 | Hendrickx | ............ G06F 21/128 |
| 2005/0172181 A1* | 8/2005 | Huliehel | ............ G01R 31/2834 714/724 |
| 2006/0107122 A1* | 5/2006 | Kasahara | ............... G06F 9/3857 714/38.1 |

(Continued)

FOREIGN PATENT DOCUMENTS

| | | |
|---|---|---|
| KR | 10-18674870000 | 7/2018 |
| KR | 10-2019-0004507 | 1/2019 |
| KR | 10-2019-0107373 | 9/2019 |

*Primary Examiner* — Sarai E Butler
(74) *Attorney, Agent, or Firm* — Kile Park Reed & Houtteman PLLC (57) ABSTRACT

Disclosed herein are an apparatus and method for transmitting fuzzing data. The apparatus may include one or more processors and executable memory for storing at least one program executed by the one or more processors. The at least one program may collect context information pertaining to a one-way fuzzing target device that uses a one-way protocol, may determine the execution state of the one-way fuzzing target device by analyzing the context information, and may transmit fuzzing data to the one-way fuzzing target device based on the result of determination of the execution state.

12 Claims, 8 Drawing Sheets

(56) References Cited

U.S. PATENT DOCUMENTS

| | | | | |
|---|---|---|---|---|
| 2008/0256340 A1* | 10/2008 | Conger | ............... | G06F 21/577 |
| | | | | 712/217 |
| 2011/0107150 A1* | 5/2011 | Kohli | ................... | G06Q 10/10 |
| | | | | 714/38.1 |
| 2013/0212435 A1* | 8/2013 | Qiu | ................... | G06F 11/3608 |
| | | | | 714/32 |
| 2014/0047275 A1* | 2/2014 | Eddington | ......... | G06F 11/0766 |
| | | | | 714/37 |
| 2015/0350235 A1* | 12/2015 | Kim | ................... | G06F 21/577 |
| | | | | 726/25 |
| 2018/0359273 A1* | 12/2018 | Woolley | ............ | H04L 63/1433 |

* cited by examiner

APPARATUS AND METHOD FOR TRANSMITTING FUZZING DATA FOR ONE-WAY PROTOCOL SOFTWARE FUZZING

CROSS REFERENCE TO RELATED APPLICATION

This application claims the benefit of Korean Patent Application No. 10-2019-0157664, filed Nov. 29, 2019, which is hereby incorporated by reference in its entirety into this application.

BACKGROUND OF THE INVENTION

1. Technical Field

The present invention relates generally to fuzzing technology, and more particularly to technology for monitoring a fuzzing execution state and dynamically transmitting fuzzing data.

2. Description of the Related Art

Among various methods for testing for security vulnerabilities in computer software, fuzzing is frequently used. Fuzzing is a method for finding bugs or security vulnerabilities by randomly inputting data to a computer program in order to incur an error or crash therein and analyzing the causes of an error or a crash when the error or crash is actually incurred in response to the data.

The conventional method performed by a fuzzing system is aimed at software using a request-response protocol. Because a fuzzing target returns a response message whenever it receives data, a fuzzer may easily determine, through the response message, the time at which to transmit fuzzing data and whether the fuzzing target is terminated. Also, the fuzzer may determine whether the fuzzing data is effective by analyzing the response message. If no response message is received from the fuzzing target for a preset time period, the fuzzer may determine that the fuzzing target is terminated, and may acquire information at the time of incidence of a crash in the fuzzing target (e.g., register information) from a target-monitoring module by requesting the same.

A one-way protocol is used for network separation, IoT wireless communication, and an industrial control system environment in order to save computing resources and provide network security. Such a one-way protocol is mainly used for transmitting sensor/system state information and event information, and the most important characteristic thereof is that no response message is returned.

A conventional method uses response messages in order to determine the fuzzing data transmission time, whether a fuzzing target is terminated, or whether fuzzing data is effective. However, because a one-way protocol is configured such that no response message is returned, the conventional method has many problems to be used for fuzzing software that uses a one-way protocol. That is, because the conventional method has no flow control, fuzzing data transmission may result in a network congestion problem. Also, it may be impossible to determine whether the fuzzing target is running or terminated and whether the fuzzing data that is currently being transmitted is effective.

Therefore, what is required is a method for providing effective fuzzing for software that uses a one-way protocol where no response message is returned.

Meanwhile, Korean Patent Application Publication No. 10-2019-0107373, titled "Fuzzing method and device for detecting network protocol vulnerability", discloses a device and method for detecting network protocol vulnerabilities by more effectively performing a state transition process during protocol fuzzing, thereby quickly checking for vulnerabilities.

SUMMARY OF THE INVENTION

An object of the present invention is to support fuzzing data transmission for software that uses a one-way protocol in which no response message is returned.

In order to accomplish the above object, an apparatus for transmitting fuzzing data according to an embodiment of the present invention may include one or more processors and executable memory for storing at least one program executed by the one or more processors. The at least one program may collect context information pertaining to a one-way fuzzing target device that uses a one-way protocol, determine the execution state of the one-way fuzzing target device by analyzing the context information, and transmit fuzzing data to the one-way fuzzing target device based on the result of determining the execution state.

Here, the at least one program may collect at least one of the CPU usage of the one-way fuzzing target device, a change in the size of memory, the CPU usage of a network task, and data that the one-way fuzzing target device transmits to a target counterpart device.

Here, the at least one program may determine the effectiveness of the fuzzing data and whether the one-way fuzzing target device operates normally.

Here, the at least one program may set the transmission rate of the fuzzing data based on the CPU usage of the one-way fuzzing target device and the CPU usage of the network task.

Here, the at least one program may determine the effectiveness of the fuzzing data based on whether the data that the one-way fuzzing target device transmits to the target counterpart device is collected.

Here, the at least one program may determine that the fuzzing data is effective when the size of the memory is changed, and may determine that the fuzzing data is not effective when the size of the memory is not changed.

Here, the at least one program may transmit test fuzzing data, corresponding to effective fuzzing data, to the one-way fuzzing target device when it is determined that the fuzzing data is effective, and may determine whether the one-way fuzzing target device operates normally based on whether the data that the one-way fuzzing target device transmits to the target counterpart device is collected.

Here, the at least one program may transmit the fuzzing data at the current transmission rate when it is determined that the fuzzing data is effective, and may transmit the fuzzing data after changing the transmission rate to the maximum transmission rate when it is determined that the fuzzing data is not effective.

Also, in order to accomplish the above object, a method for transmitting fuzzing data, performed by a fuzzing data transmission apparatus, according to an embodiment of the present invention may include collecting context information pertaining to a one-way fuzzing target device that uses a one-way protocol, determining the execution state of the one-way fuzzing target device by analyzing the context information, and transmitting fuzzing data to the one-way fuzzing target device based on the result of determining the execution state.

Here, collecting the context information may be configured to collect at least one of the CPU usage of the one-way fuzzing target device, a change in the size of memory, the CPU usage of a network task, and data that the one-way fuzzing target device transmits to a target counterpart device.

Here, determining the execution state may be configured to determine the effectiveness of the fuzzing data and whether the one-way fuzzing target device operates normally.

Here, determining the execution state may be configured to set the transmission rate of the fuzzing data based on the CPU usage of the one-way fuzzing target device and the CPU usage of the network task.

Here, determining the execution state may be configured to determine the effectiveness of the fuzzing data based on whether the data that the one-way fuzzing target device transmits to the target counterpart device is collected.

Here, determining the execution state may be configured to determine that the fuzzing data is effective when the size of the memory is changed and to determine that the fuzzing data is not effective when the size of the memory is not changed.

Here, determining the execution state may be configured to transmit test fuzzing data, corresponding to effective fuzzing data, to the one-way fuzzing target device when it is determined that the fuzzing data is effective; and to determine whether the one-way fuzzing target device operates normally based on whether the data that the one-way fuzzing target device transmits to the target counterpart device is collected.

Here, transmitting the fuzzing data may be configured to transmit the fuzzing data at the current transmission rate when it is determined that the fuzzing data is effective, and to transmit the fuzzing data after changing the transmission rate to the maximum transmission rate when it is determined that the fuzzing data is not effective.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified. Also, the term "unit', "member", "module", or the like may be understood as a unit for processing at least one function or operation, and such a unit may be implemented as hardware, software, or a combination thereof.

Hereinafter, a preferred embodiment of the present invention will be described in detail with reference to the accompanying drawings.

Figure 1:
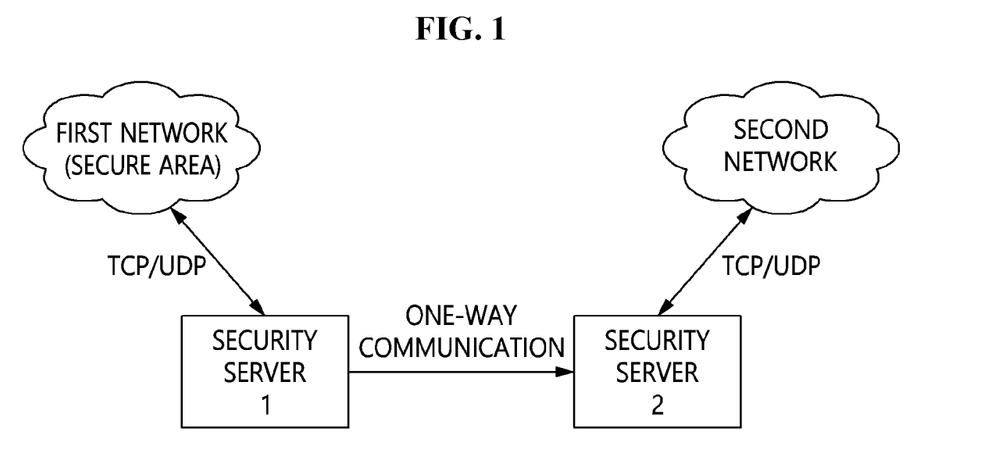
FIG. 1 is a view illustrating the structure of a one-way protocol according to an embodiment of the present invention.

FIG. 1 is a view illustrating the structure of a one-way protocol according to an embodiment of the present invention.

Referring to FIG. 1, a one-way protocol is currently used for network separation, IoT wireless communication, and an industrial control system environment in order to save computing resources and provide network security.

The one-way protocol according to an embodiment of the present invention is mainly used for transmitting sensor/system state information and event information, and the most important characteristic thereof is that no response message is returned. FIG. 1 illustrates an example in which a security server 1 and a security server 2, between which a one-way protocol is provided, are used in order to protect a first network communicating with a second network in an industrial control system. Because the security server 1 and the security server 2 perform one-way communication, a communication message can be transmitted from the first network to the second network, but a communication message cannot be transmitted from the second network to the first network.

Figure 2:
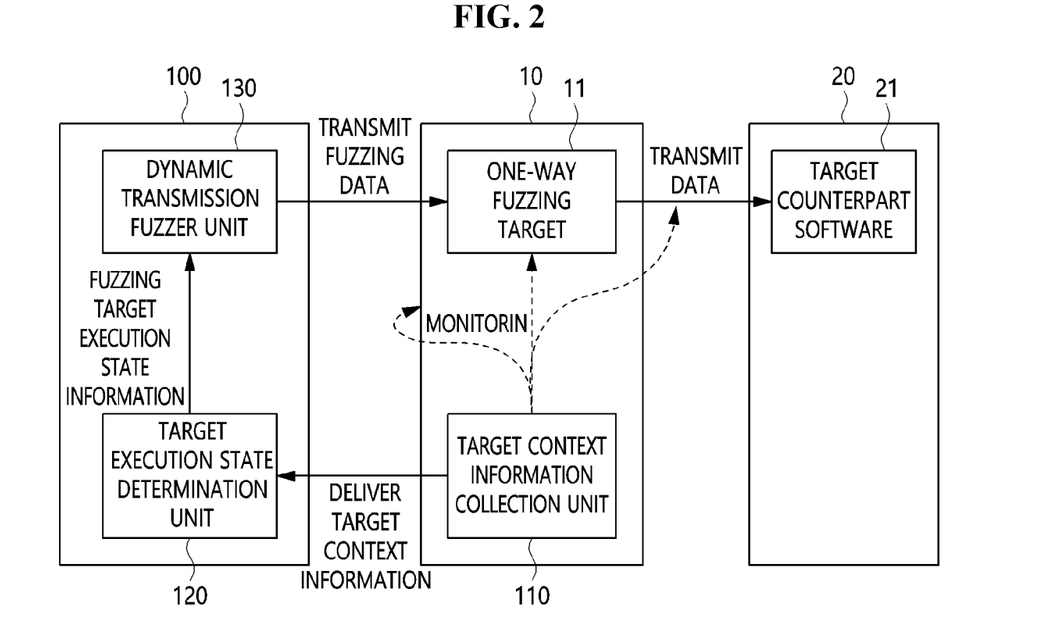
FIG. 2 is a block diagram illustrating an apparatus for transmitting fuzzing data according to an embodiment of the present invention.

FIG. 2 is a block diagram illustrating an apparatus for transmitting fuzzing data according to an embodiment of the present invention.

Referring to FIG. 2, a fuzzing system according to an embodiment of the present invention includes a one-way fuzzing target system 10, a target counterpart system 20, and an apparatus 100 for transmitting fuzzing data.

The one-way fuzzing target system 10 according to an embodiment of the present invention may include a one-way-fuzzing-target-processing unit 11.

The one-way fuzzing target system 10 may be a one-way fuzzing target device that transmits data through a one-way protocol.

For example, the one-way fuzzing target system 10 may be the security server 1 or the security server 2 illustrated in FIG. 1.

The one-way-fuzzing-target-processing unit 11 may process a one-way fuzzing target, which is software that uses a one-way protocol.

The one-way fuzzing target is a target, the security vulnerabilities of which are to be analyzed, and may be software that uses a one-way protocol.

Here, upon receiving data from the outside, the one-way-fuzzing-target-processing unit 11 may transmit the data to a target-counterpart-software-processing unit 21.

The target counterpart system 20 according to an embodiment of the present invention may include the target-counterpart-software-processing unit 21.

The target counterpart system 20 may be a target counterpart device that receives data through a one-way protocol.

The target-counterpart-software-processing unit 21 enables target counterpart software to receive data from the one-way-fuzzing-target-processing unit 11.

The target counterpart software may be software that receives data from the one-way-fuzzing-target-processing unit 11.

Here, the target counterpart software may be application software, a database system, or a file system, and may be located in the same physical system as the one-way fuzzing target.

The apparatus 100 for transmitting fuzzing data according to an embodiment of the present invention includes a target context information collection unit 110, a target execution state determination unit 120, and a dynamic transmission fuzzer unit 130.

The target context information collection unit 110 may collect context information pertaining to the one-way-fuzzing-target-processing unit 11, which uses a one-way protocol.

Here, the target context information collection unit 110 may collect context information by being included in the one-way fuzzing target system 10 or by being directly connected therewith.

Here, the target context information collection unit 110 may collect context information by monitoring the one-way fuzzing target system 10, the one-way-fuzzing-target-processing unit 11, and data transmission from the one-way-fuzzing-target-processing unit 11 to the target-counterpart-software-processing unit 21.

Here, the target context information collection unit 110 may periodically transmit the collected context information to the target execution state determination unit 120.

Here, the context information may include the CPU usage and the memory size of the one-way-fuzzing-target-processing unit 11, the CPU usage of a network task responsible for networking in the one-way fuzzing target system 10, data transmitted from the one-way-fuzzing-target-processing unit 11 to the target-counterpart-software-processing unit 21, and the like.

Here, the target context information collection unit 110 may collect at least one of the CPU usage of the one-way-fuzzing-target-processing unit 11, a change in the memory size, the CPU usage of the network task, and data that the one-way-fuzzing-target-processing unit 11 transmits to the target-counterpart-software-processing unit 21.

The target execution state determination unit 120 may determine the execution state of the one-way-fuzzing-target-processing unit 11 by analyzing the context information.

Here, the target execution state determination unit 120 may generate execution state information based on the execution state determined by analyzing the context information received from the target context information collection unit 110, and may transmit the execution state information to the dynamic transmission fuzzer unit 130.

Here, the execution state information may include the maximum transmission rate of fuzzing data allowed in the one-way fuzzing target, information about whether the target system is congested, information about whether fuzzing data is effective, information about whether the one-way fuzzing target is running, and the like.

Here, the target execution state determination unit 120 may determine whether the fuzzing data is effective and whether the one-way fuzzing target device operates normally.

Here, the target execution state determination unit 120 may set the transmission rate of the fuzzing data based on the CPU usage of the one-way-fuzzing-target-processing unit 11 and the CPU usage of the network task.

Here, the target execution state determination unit 120 may determine whether the fuzzing data is effective based on whether the data that the one-way-fuzzing-target-processing unit 11 transmits to the target counterpart device is collected.

Here, the target execution state determination unit 120 may determine that the fuzzing data is effective when the memory size is changed, and may determine that the fuzzing data is not effective when the memory size is not changed.

Here, when it is determined that the fuzzing data is effective, the target execution state determination unit 120 may transmit test fuzzing data, corresponding to the effective fuzzing data, to the one-way-fuzzing-target-processing unit 11, and may determine whether the one-way-fuzzing-target-processing unit 11 operates normally based on whether data that the one-way-fuzzing-target-processing unit 11 transmits to the target-counterpart-software-processing unit 21 is collected.

The dynamic transmission fuzzer unit 130 may transmit fuzzing data to the one-way-fuzzing-target-processing unit 11 based on the result of determination of the execution state.

Here, the dynamic transmission fuzzer unit 130 transmits fuzzing data to the one-way-fuzzing-target-processing unit 11 based on the execution state of the one-way-fuzzing-target-processing unit 11, thereby performing a security vulnerability test.

Here, the dynamic transmission fuzzer unit 130 may perform a fuzzing data dynamic transmission function through which the fuzzing data transmission rate can be increased or decreased based on the execution state information provided by the target execution state determination unit 120 or through which fuzzing data transmission can be interrupted.

Here, the dynamic transmission fuzzer unit 130 may transmit the fuzzing data at the current transmission rate when it is determined that the fuzzing data is effective, and may transmit the fuzzing data after changing the transmission rate to the maximum transmission rate when it is determined that the fuzzing data is not effective.

Figure 3:
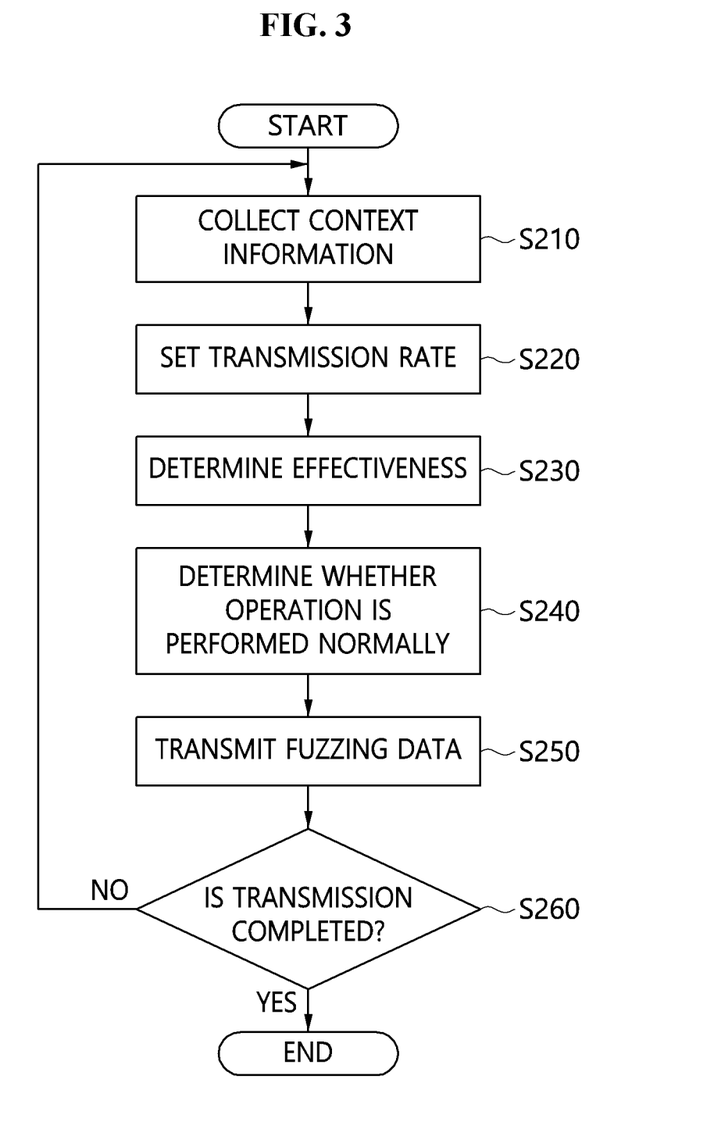
FIG. 3 is a flowchart illustrating a method for transmitting fuzzing data according to an embodiment of the present invention.
Figure 4:
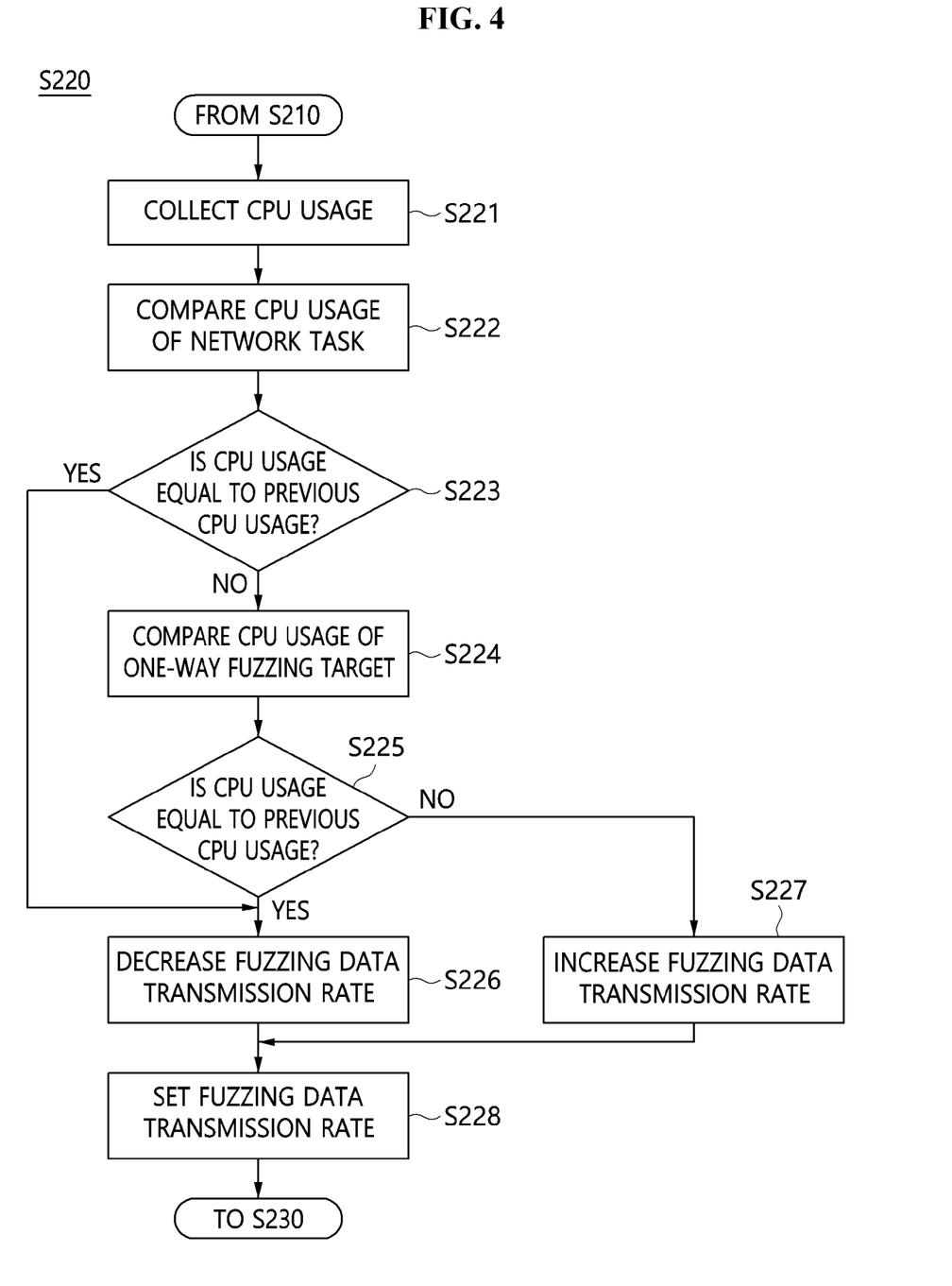
FIG. 4 is a flowchart specifically illustrating an example of the step of setting a transmission rate, illustrated in FIG. 3.
Figure 5:
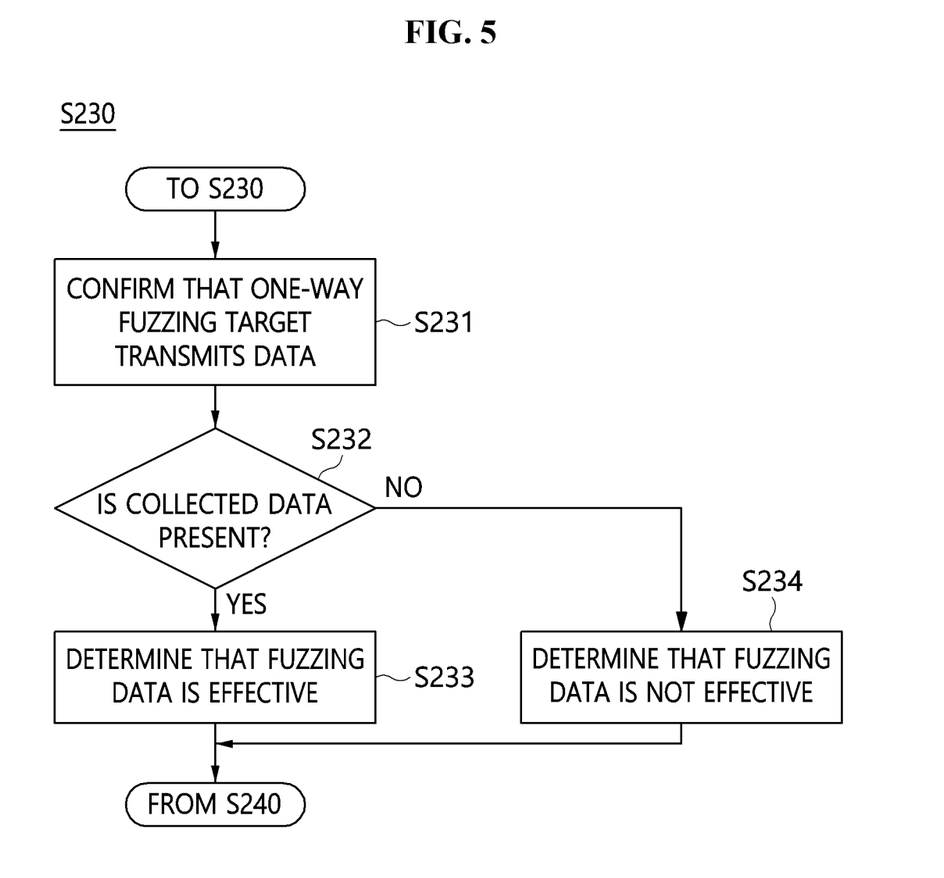
FIG. 5 and FIG. 6 are flowcharts specifically illustrating an example of the step of determining effectiveness, illustrated in FIG. 3.
Figure 6:
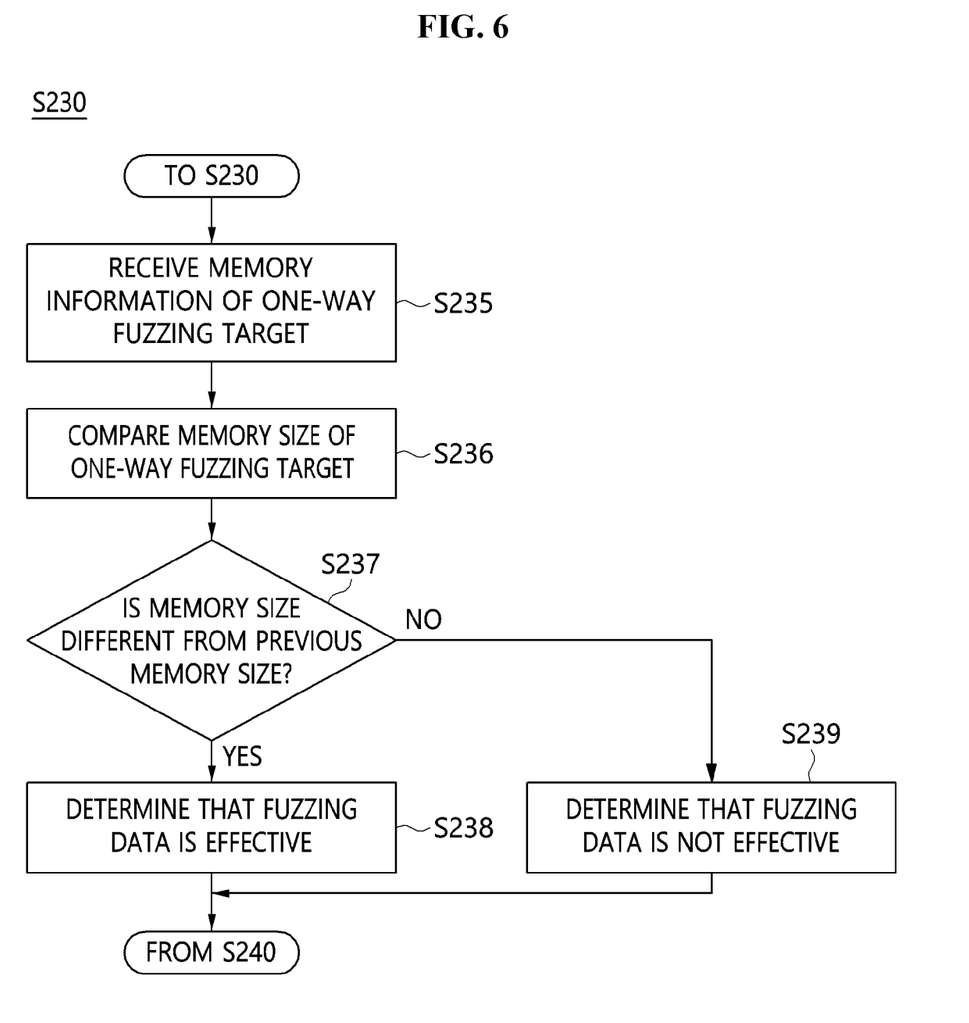
Figure 7:
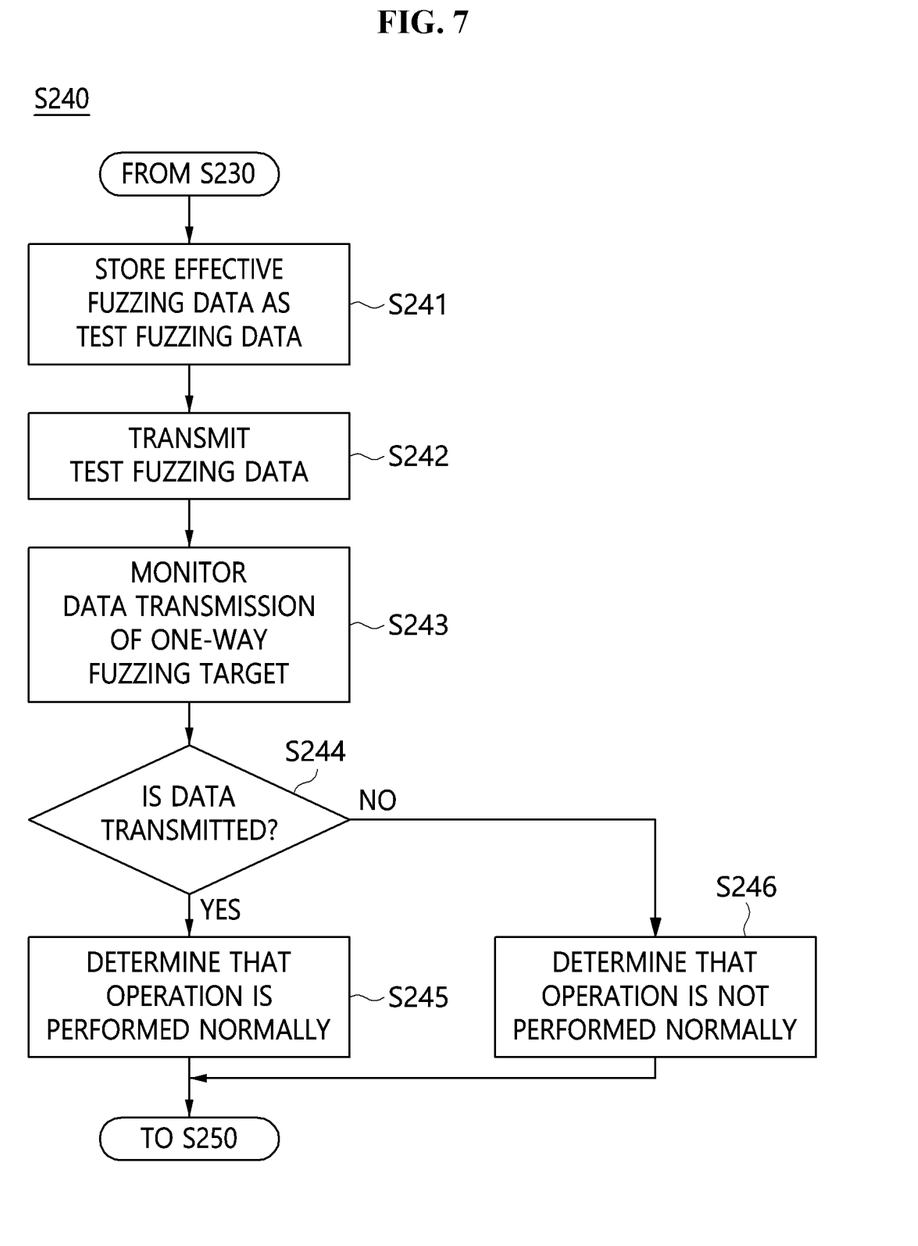
FIG. 7 is a flowchart specifically illustrating an example of the step of determining whether an operation is performed normally, illustrated in FIG. 3.

FIG. 3 is a flowchart illustrating a method for transmitting fuzzing data according to an embodiment of the present invention. FIG. 4 is a flowchart specifically illustrating an example of the step of setting a transmission rate, illustrated in FIG. 3. FIG. 5 and FIG. 6 are flowcharts specifically illustrating an example of the step of determining effectiveness, illustrated in FIG. 3. FIG. 7 is a flowchart specifically illustrating an example of the step of determining whether an operation is performed normally, illustrated in FIG. 3.

Referring to FIG. 3, in the method for transmitting fuzzing data according to an embodiment of the present invention, first, context information may be collected at step S210.

That is, at step S210, context information pertaining to the one-way fuzzing target device that uses a one-way protocol may be collected.

Here, at step S210, context information may be collected by monitoring the one-way fuzzing target system 10, the one-way-fuzzing-target-processing unit 11, and data transmission from the one-way-fuzzing-target-processing unit 11 to the target-counterpart-software-processing unit 21.

Here, at step S210, the target context information collection unit 110 may periodically transmit the collected context information to the target execution state determination unit 120.

Here, the context information may include the CPU usage and the memory size of the one-way-fuzzing-target-processing unit 11, the CPU usage of a network task responsible for networking in the one-way fuzzing target system 10, data transmitted from the one-way-fuzzing-target-processing unit 11 to the target-counterpart-software-processing unit 21, and the like.

Here, at step S210, at least one of the CPU usage of the one-way-fuzzing-target-processing unit 11, a change in the memory size of the one-way-fuzzing-target-processing unit 11, the CPU usage of the network task, and data that the one-way-fuzzing-target-processing unit 11 transmits to the target-counterpart-software-processing unit 21 may be collected.

Also, in the method for transmitting fuzzing data according to an embodiment of the present invention, an execution state may be determined at steps S220, S230 and S240.

That is, at steps S220, S230 and S240, the context information is analyzed, whereby the execution state of the one-way-fuzzing-target-processing unit 11 may be determined.

Here, at steps S220, S230 and S240, execution state information is generated based on the execution state, which is determined by analyzing the context information, and the execution state information may be transmitted to the dynamic transmission fuzzer unit 130.

Here, the execution state information may include the maximum transmission rate of fuzzing data allowed in the one-way fuzzing target, information about whether the target system is congested, information about whether the fuzzing data is effective, information about whether the one-way fuzzing target is running, and the like.

That is, at step S220, the transmission rate of fuzzing data may be set.

Here, at step S220, the transmission rate of the fuzzing data may be set based on the CPU usage of the one-way-fuzzing-target-processing unit 11 and the CPU usage of the network task.

Referring to FIG. 4, at step S220, first, the CPU usage may be collected at step S221.

That is, at step S221, the CPU usage of the one-way fuzzing target and the CPU usage of the network task of the one-way fuzzing target may be collected.

Also, at step S220, the CPU usage of the network task may be compared at step S222.

That is, at step S222, the current CPU usage of the network task of the one-way fuzzing target may be compared with the previous CPU usage thereof.

Also, at step S220, whether the current CPU usage is equal to the previous CPU usage may be checked at step S223.

That is, when it is determined at step S223 that the current CPU usage of the network task of the one-way fuzzing target is equal to the previous CPU usage thereof, the transmission rate of fuzzing data may be decreased at step S226. When the current CPU usage of the network task of the one-way fuzzing target is not equal to the previous CPU usage thereof, the CPU usage of the one-way fuzzing target may be compared at step S224.

That is, at step S224, the current CPU usage of the one-way fuzzing target may be compared with the previous CPU usage thereof.

Also, at step S220, whether the current CPU usage is equal to the previous CPU usage may be determined at step S225.

That is, when it is determined at step S225 that the current CPU usage of the one-way fuzzing target is equal to the previous CPU usage thereof, the transmission rate of fuzzing data may be decreased at step S226. When the current CPU usage of the one-way fuzzing target is not equal to the previous CPU usage thereof, the transmission rate of fuzzing data may be increased at step S227.

Also, at step S220, the transmission rate of fuzzing data may be set at step S228.

That is, at step S228, the transmission rate of fuzzing data, set based on the CPU usage, may be set as the current transmission rate of fuzzing data.

Also, at step S230, the effectiveness of the fuzzing data may be determined.

Here, at step S230, the effectiveness of the fuzzing data may be determined based on whether the data that the one-way-fuzzing-target-processing unit 11 transmits to the target counterpart device is collected.

Because fuzzing data consumes more fuzzing time without crashing the target counterpart software, information about the effectiveness of the currently transmitted data may be identified.

Here, at step S230, in order to determine the effectiveness of the fuzzing data, the communication interface between the one-way fuzzing target and the target counterpart software is monitored at steps S231 to S234, or the memory of the one-way fuzzing target is monitored, whereby the effectiveness of the fuzzing data may be determined at steps S235 to S239.

Referring to FIG. 5, at step S230, whether the one-way fuzzing target transmits data may be checked at step S231.

That is, at step S231, whether data is transmitted from the one-way fuzzing target to the target counterpart software may be checked.

Also, at step S230, whether data that the one-way fuzzing target transmits to the target counterpart software is collected may be checked at step S232.

That is, at step S232, when data is collected, it may be determined at step S233 that the fuzzing data is effective, and when no data is collected, it may be determined at step S234 that fuzzing data is not effective.

Also, at step S230, when the size of the memory is changed, it may be determined that the fuzzing data is effective, and when the size of the memory is not changed, it may be determined that the fuzzing data is not effective.

Referring to FIG. 6, at step S230, information about the memory of the one-way fuzzing target may be received at step S235.

Also, at step S230, the memory size of the one-way fuzzing target may be compared at step S236.

Also, at step S230, whether the current memory size is changed from the previous memory size may be checked at step S237.

That is, at step S237, when the current memory size is different from the previous memory size, it may be determined at step S238 that the fuzzing data is effective, and when the current memory size is not different from the previous memory size, it may be determined at step S239 that the fuzzing data is not effective.

That is, at step S240, whether the one-way fuzzing target device operates normally may be determined.

Here, at step S240, when it is determined that the fuzzing data is effective, test fuzzing data, corresponding to the effective fuzzing data, is transmitted to the one-way-fuzzing-target-processing unit 11, and whether the one-way-fuzzing-target-processing unit 11 operates normally may be determined based on whether the data that the one-way-fuzzing-target-processing unit 11 transmits to the target-counterpart-software-processing unit 21 is collected.

Referring to FIG. 7, at step S240, first, the effective fuzzing data may be stored as test fuzzing data at step S241.

Also, at step S240, the test fuzzing data may be transmitted to the one-way fuzzing target at step S242.

Also, at step S240, whether the one-way fuzzing target transmits data in response to the test fuzzing data may be monitored at step S243.

That is, at step S243, data transmission from the one-way fuzzing target, receiving the test fuzzing data, to the target counterpart software may be monitored.

Also, at step S240, whether data is transmitted may be checked at step S244.

That is, at step S243, when data transmission from the one-way fuzzing target to the target counterpart software is identified, it may be determined at step S245 that the one-way fuzzing target operates normally, but when data transmission from the one-way fuzzing target to the target counterpart software is not identified, it may be determined at step S246 that the one-way fuzzing target does not operate normally.

Also, in the method for transmitting fuzzing data according to an embodiment of the present invention, fuzzing data may be transmitted at step S250.

That is, at step S250, the fuzzing data may be transmitted to the one-way-fuzzing-target-processing unit 11 based on the result of determination of the execution state.

Here, at step S250, the fuzzing data is transmitted to the one-way-fuzzing-target-processing unit 11 based on the execution state of the one-way-fuzzing-target-processing unit 11, whereby a security vulnerability test may be performed.

Here, at step S520, a fuzzing data dynamic transmission function, through which the fuzzing data transmission rate can be increased or decreased based on the execution state information provided by the target execution state determination unit 120 or through which fuzzing data transmission can be interrupted, may be performed.

Here, at step S250, when it is determined that the fuzzing data is effective, the fuzzing data may be transmitted at the current transmission rate, and when it is determined that the fuzzing data is not effective, the fuzzing data may be transmitted after the transmission rate is changed to the maximum transmission rate.

Also, in the method for transmitting fuzzing data according to an embodiment of the present invention, whether transmission of the fuzzing data is completed may be checked at step S260.

That is, at step S260, when transmission of the fuzzing data is not completed, context information may be collected at step S210, whereas when transmission of the fuzzing data is completed, transmission of the fuzzing data may be terminated.

Figure 8:
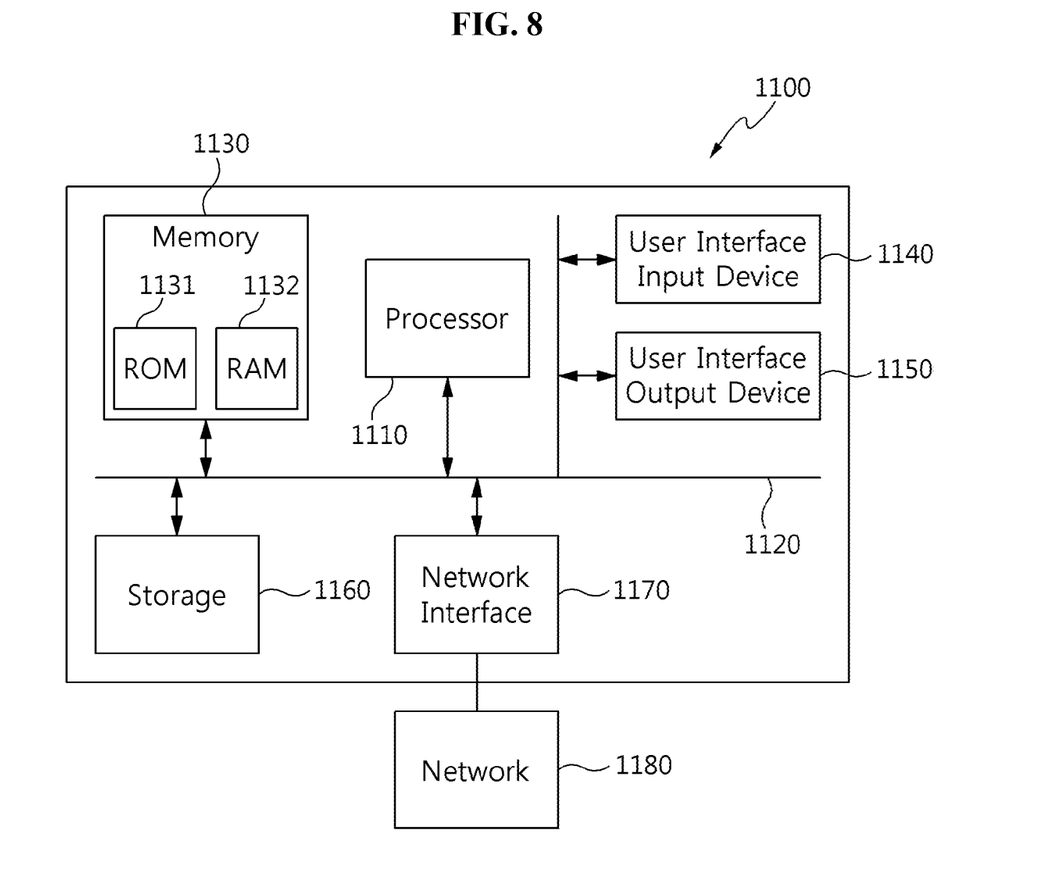
FIG. 8 is a view illustrating a computer system according to an embodiment of the present invention.

FIG. 8 is a view illustrating a computer system according to an embodiment of the present invention.

Referring to FIG. 8, the apparatus for transmitting fuzzing data according to an embodiment of the present invention may be implemented in a computer system 1100 including a computer-readable recording medium. As illustrated in FIG. 8, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for transmitting fuzzing data according to an embodiment of the present invention may include one or more processors 1110 and executable memory 1130 for storing at least one program executed by the one or more processors 1110. The at least one program may collect context information pertaining to a one-way fuzzing target device that uses a one-way protocol, may determine the execution state of the one-way fuzzing target device by analyzing the context information, and may transmit fuzzing data to the one-way fuzzing target device based on the result of determination of the execution state.

Here, the at least one program may collect at least one of the CPU usage of the one-way fuzzing target device, a change in the size of memory, the CPU usage of a network task, and data that the one-way fuzzing target device transmits to a target counterpart device.

Here, the at least one program may determine the effectiveness of the fuzzing data and whether the one-way fuzzing target device operates normally.

Here, the at least one program may set the transmission rate of the fuzzing data based on the CPU usage of the one-way fuzzing target device and the CPU usage of the network task.

Here, the at least one program may determine the effectiveness of the fuzzing data based on whether the data transmitted from the one-way fuzzing target device to the target counterpart device is collected.

Here, the at least one program may determine that the fuzzing data is effective when the size of the memory is changed, and may determine that the fuzzing data is not effective when the size of the memory is not changed.

Here, when it is determined that the fuzzing data is effective, the at least one program may transmit test fuzzing data, corresponding to the effective fuzzing data, to the one-way fuzzing target device, and may determine whether the one-way fuzzing target device operates normally based on whether the data that the one-way fuzzing target device transmits to the target counterpart device is collected.

Here, the at least one program may transmit the fuzzing data at the current transmission rate when it is determined that the fuzzing data is effective, and may transmit the fuzzing data after changing the transmission rate to the maximum transfer rate when it is determined that the fuzzing data is not effective.

The present invention may support fuzzing data transmission for software that uses a one-way protocol I which no response message is returned.

As described above, the apparatus and method for transmitting fuzzing data according to the present invention are not limitedly applied to the configurations and operations of the above-described embodiments, but all or some of the embodiments may be selectively combined and configured, so the embodiments may be modified in various ways.

What is claimed is:

1. An apparatus for transmitting fuzzing data, comprising:
one or more processors; and executable memory for storing at least one program executed by the one or more processors,
wherein the at least one program is configured to
collect context information pertaining to a one-way fuzzing target device that uses a one-way protocol,
determine an execution state of the one-way fuzzing target device by analyzing the context information, and
transmit fuzzing data to the one-way fuzzing target device based on a result of determining the execution state,
wherein the at least one program collects at least one of a CPU usage of the one-way fuzzing target device, a change in a size of memory, a CPU usage of a network task, and data that the one-way fuzzing target device transmits to a target counterpart device, and
wherein the at least one program determines that the fuzzing data is effective when the size of the memory is changed, and determines that the fuzzing data is not effective when the size of the memory is not changed.

2. The apparatus of claim 1, wherein the at least one program determines effectiveness of the fuzzing data and whether the one-way fuzzing target device operates normally.

3. The apparatus of claim 2, wherein the at least one program sets a transmission rate of the fuzzing data based on the CPU usage of the one-way fuzzing target device and the CPU usage of the network task.

4. The apparatus of claim 2, wherein the at least one program determines the effectiveness of the fuzzing data based on whether the data that the one-way fuzzing target device transmits to the target counterpart device is collected.

5. The apparatus of claim 2, wherein the at least one program transmits test fuzzing data, corresponding to effective fuzzing data, to the one-way fuzzing target device when it is determined that the fuzzing data is effective, and determines whether the one-way fuzzing target device operates normally based on whether the data that the one-way fuzzing target device transmits to the target counterpart device is collected.

6. The apparatus of claim 5, wherein the at least one program transmits the fuzzing data at a current transmission rate when it is determined that the fuzzing data is effective, and transmits the fuzzing data after changing a transmission rate to a maximum transmission rate when it is determined that the fuzzing data is not effective.

7. A method for transmitting fuzzing data, performed by a fuzzing data transmission apparatus, comprising:
collecting context information pertaining to a one-way fuzzing target device that uses a one-way protocol;
determining an execution state of the one-way fuzzing target device by analyzing the context information; and
transmitting fuzzing data to the one-way fuzzing target device based on a result of determining the execution state,
wherein collecting the context information is configured to collect at least one of a CPU usage of the one-way fuzzing target device, a change in a size of memory, a CPU usage of a network task, and data that the one-way fuzzing target device transmits to a target counterpart device, and
wherein determining the execution state is configured to determine that the fuzzing data is effective when the size of the memory is changed and to determine that the fuzzing data is not effective when the size of the memory is not changed.

8. The method of claim 7, wherein determining the execution state is configured to determine effectiveness of the fuzzing data and whether the one-way fuzzing target device operates normally.

9. The method of claim 8, wherein determining the execution state is configured to set a transmission rate of the fuzzing data based on the CPU usage of the one-way fuzzing target device and the CPU usage of the network task.

10. The method of claim 8, wherein determining the execution state is configured to determine the effectiveness of the fuzzing data based on whether the data that the one-way fuzzing target device transmits to the target counterpart device is collected.

11. The method of claim 8, wherein determining the execution state is configured to:
transmit test fuzzing data, corresponding to effective fuzzing data, to the one-way fuzzing target device when it is determined that the fuzzing data is effective; and
determine whether the one-way fuzzing target device operates normally based on whether the data that the one-way fuzzing target device transmits to the target counterpart device is collected.

12. The method of claim 11, wherein transmitting the fuzzing data is configured to:
transmit the fuzzing data at a current transmission rate when it is determined that the fuzzing data is effective, and
transmit the fuzzing data after changing a transmission rate to a maximum transmission rate when it is determined that the fuzzing data is not effective.

* * * * *